Patented Feb. 20, 1951

2,542,767

UNITED STATES PATENT OFFICE 2,542,767

ORGANIC ESTER SYNTHESIS

William F. Gresham and Richard E. Brooks, Wilmington, Del., assignors to E. I. du Pont de Nemours & Company, Wilmington, Del., a corporation of Delaware No Drawing. Application February 11, 1949,
Serial No. 75,968

18 Claims. (Cl. 260—483)

This invention relates to the synthesis of organic oxygen-containing compounds and more particularly to the synthesis of esters of organic carboxylic acids by reaction between organic compounds containing olefinic unsaturation, carbon monoxide and alcohols. This application is a continuation-in-part of our copending application S. N. 712,736, filed November 27, 1946, which in turn, is a continuation-in-part of our application S. N. 629,698, filed November 19, 1945, both of which applications have been abandoned. This application is also a continuation-in-part of our copending application S. N. 636,262, which was filed on December 20, 1945, now Patent No. 2,526,742.

In the Vail patent, U. S. 1,979,717, it is disclosed that esters can be prepared by reaction between olefins, carbon monoxide, and aliphatic alcohols in the presence of certain catalysts, e. g. ammonium chloride, phosphoric acid, etc. The Vail patent expressly states that it is desirable to avoid the presence of metallic carbonyls in carrying out the reaction. Certain metal halide type compounds, such as the halides of calcium, barium, strontium, sodium, potassium, calcium, rubidium, lithium, tin, iron, cobalt, nickel, bismuth, manganese, lead, titanium, zinc, cadmium, molybdenum and boron have also been found to be catalysts for somewhat similar syntheses, such as the synthesis of propionic acid from ethylene, carbon monoxide and water, but in all instances the only catalysts which have given promising results heretofore in such syntheses have been halide type catalysts, which, in general, are excessively corrosive to metals under the reaction conditions.

An object of this invention is to provide a method for the synthesis of esters of organic carboxylic acids in the presence of catalysts which are not excessively corrosive upon the pumps and reaction vessels employed in the process. A further object is to provide a commercially feasible process for the manufacture of esters of organic carboxylic acids from readily available and very inexpensive starting materials. Other objects and achievements of the invention will appear hereinafter.

These objects are accomplished in accordance with the invention by reacting an organic compound containing non-aromatic olefinic unsaturation with carbon monoxide and an alcohol at elevated temperatures and pressure in the presence of a catalyst containing cobalt as an essential ingredient. It is to be understood that the cobalt may be present in the free metallic state or may be combined with other substances in the form of alloys or compounds, as, for example, cobalt carbonyl. No halide need be present; in fact, preferred catalysts include organic compounds of cobalt, which give outstanding results in the absence of cobalt halides or any other source of halogen acid. In specific embodiments, and by way of illustration, the invention contemplates the synthesis of esters in accordance with the following equations in the presence of the herein disclosed catalyst:

(1)

$$CH_2=CH_2 + CH_3OH + CO \longrightarrow CH_3CH_2COOCH_3$$

(2)

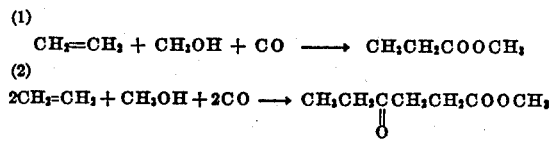

The latter equation represents a new type of reaction which, in accord with the present invention, takes place under herein disclosed conditions, particularly at very high pressures, e. g. pressures in excess of 1500 atmospheres. Analogous reactions take place with olefinic reactants other than ethylene and with alcohol reactants other than methanol.

In certain embodiments the invention comprises reacting an organic compound containing non-aromatic olefinic unsaturation with carbon monoxide and a primary alcohol of the formula ROH (R being an alkyl, or aralkyl group), at elevated temperatures and pressures in the presence of the cobalt-containing catalyst, and in the absence of other catalysts for the reaction (e. g. cobalt halides), whereby compounds of the formula acylOR are produced.

It is generally preferred to carry out the reaction between olefinic compounds, carbon monoxide and alcohols in accordance with the invention, in the absence of any substantial quantity of halide, or free inorganic acidic catalysts. It is thus frequently desirable to employ metallic cobalt catalysts, or cobalt carbonyls (this term "carbonyl" being used throughout the specification and the appended claims to include all forms of carbonyls and carbonyl hydrides, e. g.

$Co_4(CO)_{12}$ and $CoH(Co)_4$), or soluble cobalt salts, in the absence of inorganic acid catalysts, such as hydrogen halides or boron fluoride. The organic or inorganic salts (not including halides) which are effective as catalysts for the reaction, may, of course, have an acidic reaction towards indicators. Organic salts of cobalt, such as cobait salts of carboxylic acids, give outstanding results.

It is to be understood that metallic cobalt or the salts, oxides, hydrides, etc., of cobalt, in general, may be introduced into the reaction vessel and thereafter may be converted at least in part to cobalt carbonyl under the reaction conditions. Cobalt carbonyl may indeed be the active agency through which the carbon monoxide reacts with the olefinic compound. Regardless of this theory, it is to be understood, for the purposes of the present application, that the term "catalyst" refers to the cobalt-containing substance, whether or not it is converted to carbonyl during the process. It is also to be understood, for example, that cobalt carbonyl, if it is introduced as such or formed as an intermediate, may be converted in whole or in part to more complex compounds of cobalt by reaction with alcohols, etc., under the conditions of the synthesis. When such a reaction of cobalt carbonyl occurs, numerous organic compounds of cobalt may be produced, but this does not detract from the value of the process since all of the organic compounds of cobalt are operative in the practice of the invention; thus, it is possible to recover the cobalt in the form of an organic or inorganic compound of cobalt after the reaction is complete, and to reuse such recovered cobalt compounds in a subsequent reaction between the alcohol, olefinic compound, carbon monoxide.

The unsaturated compounds containing olefinic unsaturation which may be used in accordance with this invention are the olefinic hydrocarbons and other organic compounds containing a (i. e. at least one) non-aromatic double bond between the carbon atoms. Suitable examples of such compounds are the olefinic hydrocarbons themselves, e. g. ethylene, alkyl-substituted ethylene (such as propylene, butene-2, isobutylene, pentene-1, tetramethyl ethylene, diisobutylene, triisobutylene, tetraisobutylene and cracked gasoline fractions), cyclohexene, butadiene, isoprene, polymerized dienes, styrene, alpha-methyl styrene, vinyl cyclohexene, pinene, limonene, mixed olefins or olefin fraction obtained by cracking and/or dehydrogenation of petroleum, cyclohexadiene, dicyclopentadiene; unsaturated oxygenated compounds such as allyl alcohol, allyl acetate, allyl ethers, methallyl alcohol, vinyl acetate, furane, methyl methacrylate, methyl acrylate, methallyl propionate, methyl oleate, oleic acid, methyl vinyl ketone, methyl vinyl ether, cyclohexene carboxylic acids, esters of cyclohexene carboxylic acids, methallyl methacrylate, acrolein; and, in general, the unsaturated hydrocarbons, esters, ethers, carboxylic acids, amides, aldehydes, and ketones containing non-benzenoid olefinic unsaturation, especially the unsaturated organic compounds as above described which do not contain elements other than carbon, hydrogen, oxygen or nitrogen. Halogen-containing olefinic compounds which do not form halide catalysts may also be employed. It is sometimes desirable to employ polymerization inhibitors with the readily polymerizable reactants.

The alcohols which may be employed in the practice of the invention include the primary monohydric and primary polyhydric alcohols such as, methanol, ethanol, n-propanol, n-butanol, isobutanol, allyl alcohol, lauryl alcohol, myricyl alcohol, nitroalkanols, chlorohydrin, methoxyethanol, methoxymethoxyethanol, ethylene glycol, glycol monoesters, glycerin, polyvinyl alcohol, triethanolamine, benzyl alcohol, monoethanolamine, hydroxyacetic acid, methyl hydroxyacetate, and the like; and cycloaliphatic primary alcohols such as, hexahydrobenzyl alcohol, beta-cyclohexyl ethanol, beta- or gamma-cyclohexyl propanol, etc.

The reaction is preferably conducted by heating the mixture of organic compound containing olefinic unsaturation, carbon monoxide, and the alcohol in a suitable pressure-resistant vessel in the presence of a cobalt catalyst. The simple mono-olefin hydrocarbons having from 2 to 4 carbon atoms per molecule generally do not require as high a pressure as is required by the highly branched olefins, such as tetramethylethylene. In general, however, the pressure should be within the range of about 50 to 3000 atmospheres, or even higher, the maximum pressure being limited only by the strength of the retaining vessel. The simple olefinic hydrocarbons, particularly ethylene, propylene, and isobutylene may be reacted, according to the invention, very satisfactorily at pressures within the range of 200 to 1500 atmospheres. Pressures exceeding 1000 atmospheres are frequently required for the highly branched olefinic compounds. If oxo-substituted esters are desired, pressures in excess of 1500 atmospheres, suitably about 3000 atmospheres, or even higher, should be employed. Oxo-substituted esters are produced, for example, when the pressure is 8000 atmospheres.

The amount of catalyst which may be employed in the practice of the invention may be varied widely but is generally about 0.05% to about 30% of the total weight of the reaction mixture. If desired, the aforesaid catalysts may be employed in combination with inert materials or supports such as charcoal, silica, aluminum, kieselguhr, pumice, etc., or promoters such as $ThO_3$, Mn, etc. In particular embodiments, the cobalt content of the catalysts disclosed herein may be replaced at least in part by nickel.

The reaction between the olefinic compound, carbon monoxide, and alcohol may be conducted either batchwise or continuously. When solid catalysts are employed, they may be used in the form of a fixed bed or they may be conducted through the reaction vessel along with the reactants. Alternatively, solid catalysts may be employed in a finely divided fluidized state or they may be suspended in the reaction mixture. The reaction may be conducted either in the liquid or the vapor phase. When soluble forms of catalyst such as cobalt salts of organic carboxylic acids or cobalt carbonyl are employed, they may be introduced as solutions in one of the reactants or in a diluent. Recovered forms of the catalyst are especially effective and may be recycled.

The relative proportions of reactants employed may be the stoichiometrically required quantities, although other proportions may be employed if desired. Excellent results are obtained when the mole ratio of olefinic compound:CO:alcohol is about 1:1:1 to about 1:20:1.

If desired, any inert liquid may be employed as a reaction medium. However, the reaction may be conducted satisfactorily in the absence of any added medium. Examples of suitable inert organic solvents which may be employed as reaction media are cyclohexane, xylene, benzene, saturated hydrocarbons, esters and the like. To suppress the water-gas reaction it is frequently preferred to employ carbon dioxide as a diluent.

The invention is illustrated further by means of the following examples.

*Example 1.*—A mixture containing 144 grams of methanol, 21 grams of ethylene and 10 grams of finely divided metallic cobalt was heated for 90 minutes at a temperature of 240° to 260° C. under a pressure of 650 to 745 atmospheres of carbon monoxide. The resulting product was distilled yielding cobalt carbonyl and a methanol-methyl propionate azeotrope which corresponded to a 42% conversion to methyl propionate, and diethyl ketone corresponding to 33% conversion.

*Example 2.*—A mixture containing 144 grams of methanol, 42 grams of butene-1 and 5 grams of cobalt propionate was heated for 105 minutes at a temperature of 240° to 250° C. under a pressure of 690 to 750 atmospheres of carbon monoxide. The conversion to methyl n-valerate was 24.7%.

*Example 3.*—A mixture containing 144 grams of methanol, 42 grams of isobutylene and 5 grams of cobalt propionate was heated for one hour at a temperature of 240° to 255° C. under a pressure of 675 to 725 atmospheres of carbon monoxide. The conversion to methyl isovalerate was 11.8%.

*Example 4.*—A mixture containing 138 grams of ethanol, 10.5 grams of ethylene and 20 grams of cobalt propionate was heated for 20 minutes at a temperature of 180° to 215° C. under a pressure of 400 to 705 atmospheres of carbon monoxide. The conversion to ethyl propionate was 41%, over and above the maximum conversion that could have been obtained by reaction between the cobalt propionate and ethanol.

*Example 5.*—A mixture containing 150 grams of methanol, 14 grams of ethylene and 20 grams of cobalt propionate was heated at a temperature of 240° to 250° C. for 11 minutes under a pressure of 660 to 705 atmospheres of carbon monoxide. Distillation of the resulting product gave a methyl propionate-methanol azeotrope which corresponded to a 49.5% conversion to methyl propionate.

*Example 6.*—A mixture containing 160 grams of methanol, 31.5 grams of propylene, and 5 grams of cobalt propionate was heated for 35 minutes at 225° to 240° C. under a pressure of 610 to 725 atmospheres of carbon monoxide. Conversion to methyl n-butyrate was 23.6%.

*Example 7.*—A mixture of 186 grams of ethylene glycol, 28 grams of ethylene and 5 grams of cobalt propionate was heated for 1 hour at 250° to 300° C. under a pressure of 545 to 765 atmospheres of carbon monoxide. The conversion to ethylene glycol monopropionate was 40%.

*Example 8.*—A 400 cc. silver-lined high pressure shaker tube, charged with 64 grams of methanol and 5 grams of cobalt (reduced cobaltous oxide), was closed and pressured with carbon monoxide to 300 atmospheres. It was heated to 200° C. (pressure 600 atmospheres) and liquid butadiene was then injected at ca. 40 cc. per hour over a period of 2 hours until the pressure reached 700 atmospheres. Heating was then continued at 196° to 204° C. for 6.5 hours during which the pressure dropped to 580 atmospheres. The liquid product was extracted with water to remove methanol and filtered to remove catalyst residues. Distillation yielded an ester boiling at ca. 126° C. which was identified as methyl 4-pentenoate by its hydrolysis to a C₅ unsaturated acid and conversion to the amide, which had a melting point 102.2° to 103.2° C. and gave no depression in melting point when mixed with an authentic specimen of the amide of 4-pentenoic acid.

*Example 9.*—A 400 cc. silver-lined, high pressure shaker tube was charged with 128 grams of methanol and 5 grams of cobalt-copper-thoria catalyst (100:3:18). It was then pressured with carbon monoxide to 400 atmospheres and heated to 200° C. (650 atmospheres). Butadiene was injected at approximately 40 cc. per hour for 1.5 hours, raising the pressure to 810 atmospheres, and reaction was continued for an additional 7.5 hours at 198° to 200° C. The conversion of butadiene to methyl-4-pentenoate was 16%, and the yield was ca. 80%.

*Example 10.*—A 400 cc. silver, high pressure shaker tube was charged with 64 grams of methanol and 5 grams of cobalt (reduced cobaltous oxide). It was pressured with carbon monoxide to 400 atmospheres and then heated to 198° C., which caused the pressure to increase to 540 atmospheres. Isoprene was injected at approximately 40 cc. per hour during 1.5 hours, which raised the pressure to 690 atmospheres; the reaction was then continued for 7.5 hours at 197° to 200° C. The product was washed with water to remove methanol and filtered to remove catalyst residue. The product boiling at 143° to 145° C. comprised the methyl ester of a C₆ unsaturated fatty acid and 27% of unsaponifiable byproduct.

*Example 11.*—A distillation heel (which was obtained by distilling the product resulting from the reaction between methanol, carbon monoxide and propylene in the presence of cobalt carbonyl produced in situ from metallic cobalt and carbon monoxide at a temperature of about 200° to 250° C., under a pressure of about 800 atmospheres; weight of heel 10 grams, cobalt content 0.57 gram) was processed with 120 grams of methanol and 21 grams of propylene for 10 minutes at 235° to 240° C. with carbon monoxide under a pressure of 800 atmospheres in a silver-lined shaker tube. Distillation of the resulting product gave 39 grams of methyl butyrate and 12 grams of a distillation heel containing 0.54 gram of cobalt. This distillation heel could be recycled and recovered repeatedly in the synthesis of successive quantities of methyl butyrate by the same procedure.

*Example 12.*—A 400 cc. silver-lined, high pressure shaker tube was charged with 128 grams (4 mols) of methanol, 38 grams (0.33 mol) of methyl 4-pentenoate, and 5 grams of reduced, unsintered cobalt oxide catalyst, pressured with carbon monoxide to 450 atmospheres and heated at 238° to 242° C. for 9.5 hours. During this period the pressure fell from 665 atmospheres to 520 atmospheres. The reactor was cooled, pressure was released, and the liquid product was discharged. This product was steam distilled and the steam volatile oil was separated, washed with water and dried over calcium chloride; weight 25 grams. Distillation yielded a mixture of methyl esters of 6-carbon dibasic acids (B. P. 114° to 123° C./30 mm.) corresponding to a conversion of 17%. Hydrolysis of the mixed esters yielded a mixture of dibasic acids which were separated by fractional extraction and crystallization to give a major proportion of adipic acid, the remainder consisting of more soluble acids which were not identified.

*Example 13.*—A mixture consisting of 32 grams methanol, 14 grams ethylene, and 2 grams cobaltous acetate was heated at 200° to 210° C. with carbon monoxide under 3000 atmospheres pressure for 30 minutes. Distillation of the resulting product gave 14.9 grams of methyl 4-oxohexanoate.

*Example 14.*—A mixture consisting of 30 grams of isopropyl alcohol, 28 grams of ethylene, and 1 gram of Co₂(CO)₈ was heated at 200° to 215° C. with carbon monoxide under 3000 atmospheres pressure for 60 minutes. A mixture of products was obtained, including 7.0 grams of a keto-ester of the formula

CH₃CH₂COCH₂CH₂COOCH(CH₃)₂

*Example 15.*—A mixture consisting of 28 grams of isobutylene, 32 grams of methanol, 1.0 gram hydroquinone, 1.0 gram Co(CO)₈, and 0.6 gram iodine was heated at 295° to 300° C. for 30 minutes with carbon monoxide under a pressure of 3000 atmospheres. Distillation of the resulting mixture gave 16.5 grams of methyl isovalerate, B. P. 112°–118° C.

*Example 16.*—A mixture of 93.1 grams of lauryl alcohol, 7 grams ethylene and 1 gram Co₂(CO)₈ was heated for 30 minutes at 210° C. with carbon monoxide under a pressure of 44,000 to 45,000 pounds per square inch. Distillation of the resulting product at 5 to 7 mm. pressure gave a series of fractions, indicating that the product was quite complex. Some of the fractions solidified on condensation at about room temperature. The fraction boiling at 125° to 220° C./7 mm. had an ester number of 59.5 and a carbonyl number of 78.3.

*Example 17.*—A mixture of 70 grams of 1-decene, 32 grams of methanol, and 1 gram Co₂(CO)₈ was heated for one hour at 200° to 215° C. under a pressure of 41,000 to 45,000 pounds per square inch. Distillation of the resulting mixture gave 59 grams of a methyl hendecanoate fraction, B. P. 70° to 85° C./2 to 3 mm. A distillation heel (weight 6.5 grams) remained; this contained solid ingredients, a sample of which had a carbonyl number of 120.6.

*Example 18.*—A pressure vessel is charged with 0.2 part of cobalt carbonyl, 3.18 parts of methanol, 1.33 parts of ethylene, and 1.56 parts of carbon monoxide and heated for 18 hours at 200° C. under a pressure of 8500 to 7500 atmospheres. Two and seventy-seven hundredths parts of gas is absorbed. The vessel is washed out with methanol and the resulting solution is first centrifuged to remove solid matter and then distilled to give the following fractions:

A. 9.63 parts, B. P. 61 to 66° C./760 mm.
B. 0.57 part, B. P. 196 to 201° C./760 mm.
C. 0.73 part, B. P. 40 to 102° C./0.5 mm.

Fraction A had a saponification equivalent of 560, corresponding to 1.51 parts of ester calculated as methyl propionate. Treatment of 0.8 part of A with 2,4-dinitrophenylhydrazine yielded 0.07 part of diethyl ketone 2,4-dinitrophenylhydrazone, M. P. 151° to 152° C. alone or mixed with an authentic sample. This indicated the presence of 0.27 part of diethyl ketone in A. When 0.15 part of B was treated at 25° with 75 parts of 2N hydrochloric acid saturated with 2,4-dinitrophenylhydrazine, two 2,4-dinitrophenylhydrazones were formed. The first (0.051 part), after recrystallization from methanol, melted at 105° to 106° C. alone or mixed with the 2,4-dinitrophenylhydrazone of a substance which was obtained from a run made at lower pressure and identified as methyl 4-ketohexanoate. The second (0.035 part), M. P. 186° to 187° C., after recrystallization from xylene, was soluble in 5% sodium bicarbonate solution and was similarly identified as 4-ketohexanoic acid 2,4-dinitrophenylhydrazone.

We claim:

1. A process for the production of esters of organic carboxylic acids which comprises heating a non-aromatic hydrocarbon containing olefinic unsaturation with carbon monoxide and a primary alcohol at a temperature in the range of from 150° to 500° C., under a pressure of at least 50 atmospheres, in the presence of a catalyst which has been introduced into the reaction mixture in the form of a substance selected from the class consisting of metallic cobalt, cobalt oxides, cobalt metal carbonyls, and cobalt salts of organic carboxylic acids, and thereafter separating from the resulting mixture an organic carboxylic ester formed by the ensuing reaction between the said hydrocarbon, carbon monoxide, and primary alcohol, the said process being carried out in the absence of any other catalyst for the said reaction.

2. A process for the production of esters of organic carboxylic acids which comprises heating ethylene with carbon monoxide and methanol at a temperature in the range of from 175° to 375° C., under a pressure in excess of 1500 atmospheres, in the presence of a catalyst which has been introduced into the reaction mixture in the form of a substance selected from the class consisting of metallic cobalt, cobalt oxides, cobalt metal carbonyls, and cobalt salts of organic carboxylic acids, and thereafter separating from the resulting mixture an organic carboxylic ester formed by the ensuing reaction between the said ethylene, carbon monoxide, and methanol, the said process being carried out in the absence of any other catalyst for the said reaction.

3. A process for the production of esters of 4-oxohexanoic acid which comprises reacting ethylene with carbon monoxide and an hydroxyalkane having from 1 to 4 carbon atoms per molecule, at a temperature within the range of from 175° to 375° C. under a pressure within the range of 1500 to 8500 atmospheres in the presence of a cobalt carbonyl catalyst, whereby an ester of 4-oxohexanoic acid is produced, and thereafter separating the said ester from the resulting mixture.

4. The process of claim 3 in which the said hydroxyalkane is methanol and the said ester of 4-oxohexanoic acid is methyl 4-oxohexanoate.

5. A process for the poduction of esters of organic carboxylic acids which comprises heating a monolefinic hydrocarbon having from 2 to 4 carbon atoms per molecule with carbon monoxide and a primary alcohol in the presence of an organic compound of cobalt as the sole catalyst, at a temperature in the range of from 150° to 500° C. under a pressure of from 50 to 3000 atmospheres and recovering from the resulting mixture the ester produced by the ensuring reaction.

6. A process for the production of organic oxygen-containing compounds which comprises heating ethylene with carbon monoxide and a primary alcohol in the presence of a catalytic quantity of cobalt propionate at a temperature in the range of from 150° to 500° C. under a pressure of from 50 to 3000 atmospheres, in the absence of a halide catalyst, and recovering from the resulting mixture the ester produced by the ensuing reaction.

7. A process for the production of esters of organic carboxylic acids which comprises heating a non-aromatic hydrocarbon containing olefinic unsaturation with carbon monoxide and a primary alcohol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of from 150° to 500° C., under a pressure of from 50 to 3000 atmospheres, and thereafter separating from the resulting mixture the organic carboxylic acid ester formed by the ensuing reaction between the said hydrocarbon, carbon monoxide, and primary alcohol, the said process being carried out in the absence of any other catalyst for the said reaction.

8. A process for the production of esters of organic carboxylic acids which comprises heating ethylene with carbon monoxide and a primary alcohol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of from 150° to 500° C., under a pressure from 50 to 3000 atmospheres, and thereafter separating from the resulting mixture the organic carboxylic acid ester formed by the ensuing reaction, said process being carried out in the absence of any other catalyst for the said reaction.

9. A process for the production of esters of organic carboxylic acids which comprises heating an olefinic hydrocarbon having from 2 to 4 carbon atoms per molecule with carbon monoxide and a primary alcohol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 150° to 500° C., under a pressure of 50 to 3000 atmospheres, whereby a reaction product containing ester is produced, said process being carried out in the absence of any other catalyst for the said reaction.

10. A process for the production of esters of organic carboxylic acids which consists essentially in introducing into a reaction vessel a primary aliphatic alcohol, a non-aromatic hydrocarbon containing olefinic unsaturation, carbon monoxide, and 0.05% to about 30% by weight, based on the weight of the reaction mixture, of a catalyst from the class consisting of metallic cobalt, cobalt oxides, cobalt metal carbonyls, and cobalt salts of organic carboxylic acids, heating the resulting mixture at a temperature in the range of 175° to 375° C. under a pressure of from 50 to 3000 atmospheres, whereby an organic ester is produced by reaction between the said hydrocarbon, carbon monoxide and alcohol, and thereafter separating the said organic ester from the resultant reaction product.

11. A process for the production of esters of organic carboxylic acids which comprises heating ethylene with carbon monoxide and a primary alcohol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating an organic ester from the resultant reaction product, said process being carried out in the absence of any other catalyst for the said reaction.

12. A process for the preparation of methyl propionate which comprises heating ethylene with carbon monoxide and methanol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating methyl propionate from the resultant product, said process being carried out in the absence of any other catalyst for the said reaction.

13. A process for the preparation of ethyl propionate which comprises heating ethylene with carbon monoxide and ethanol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating ethyl propionate from the resultant product, said process being carried out in the absence of any other catalyst for the said reaction.

14. A process for the preparation of a polyhydric alcohol propionate which comprises heating ethylene with carbon monoxide and a primary polyhydric aliphatic alcohol in the pressence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating the polyhydric alcohol propionate from the resultant product, said process being carried out in the absence of any other catalyst for the said reaction.

15. A process for the production of esters of organic carboxylic acids which comprises heating a non-aromatic hydrocarbon containing olefinic unsaturation with carbon monoxide and a primary aliphatic alcohol in the presence of a catalyst which has been introduced into the reaction vessel in the form of a substance selected from the class consisting of metallic cobalt, cobalt oxides, cobalt metal carbonyls, cobalt salts of organic carboxylic acids, at a temperature in the range of 175° to 375° C. under a pressure of from 50 to 3000 atmospheres, and thereafter separating an organic ester of a carboxylic acid from the resultant product, said process being carried out in the absence of any other catalyst for the said reaction.

16. A process for the production of organic carboxylic acids which comprises heating a non-aromatic hydrocarbon containing olefinic unsaturation with carbon monoxide and methanol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating an organic ester of a carboxylic acid from the resultant product, said process being carried out in the absence of other catalysts for the said reaction.

17. A process for the production of esters of organic carboxylic acids which comprises heating a non-aromatic hydrocarbon containing olefinic unsaturation with carbon monoxide and ethanol in the presence of a catalyst which has been introduced into the reaction vessel in the form of a substance selected from the class consisting of metallic cobalt, cobalt oxides, cobalt metal carbonyls, and cobalt salts of organic carboxylic acids, at a temperature in the range of 175° to 375° C. under a pressure of from 50 to 3000 atmospheres, and thereafter separating an organic ester of a carboxylic acid from the resultant product, said process being carried out in the absence of other catalysts for the said reaction.

18. The method for preparing methyl 4-oxo-hexanoate by reacting ethylene, methanol and carbon monoxide at a pressure within the range of 1500 to 8500 atmospheres in accord with the equation

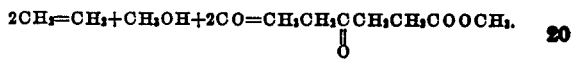

and thereafter separating the said methyl 4-oxo-hexanoate from the resulting mixture.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,979,717 | Vail | Nov. 6, 1934 |

OTHER REFERENCES

Intelligence Division Report No. 4149, "Advances in Acetylene Chemistry," pp. 20–26, Mar. 24, 1945.